June 28, 1960
S. GILBERT
2,942,481
STARTER HAVING REVERSE TORQUE RELEASE
Filed Jan. 8, 1959
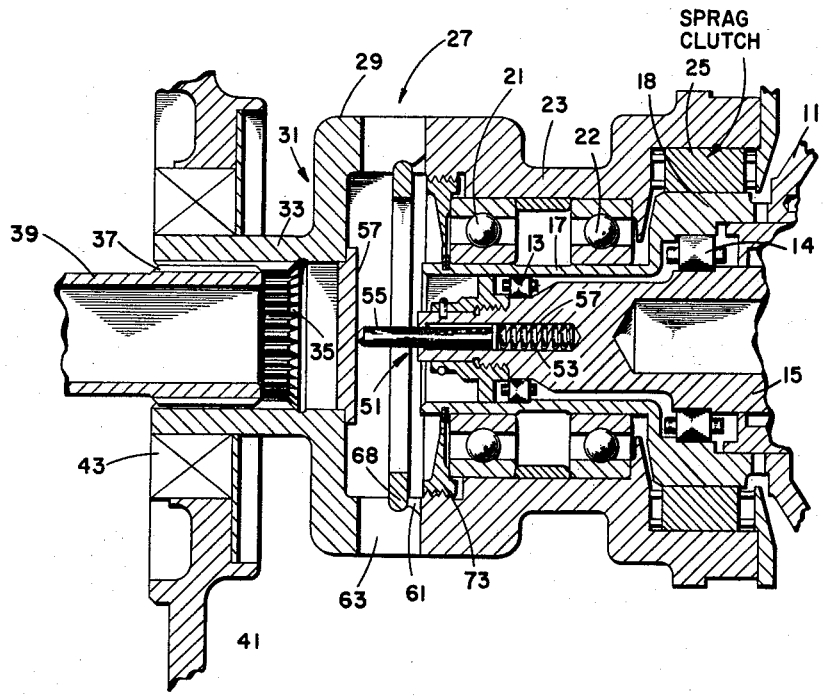
FIG. I
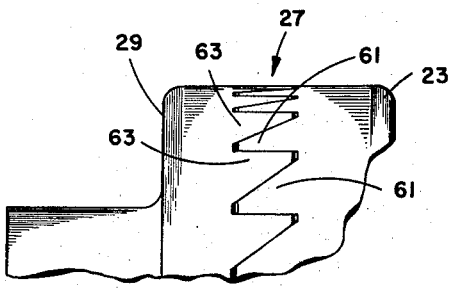
FIG. II
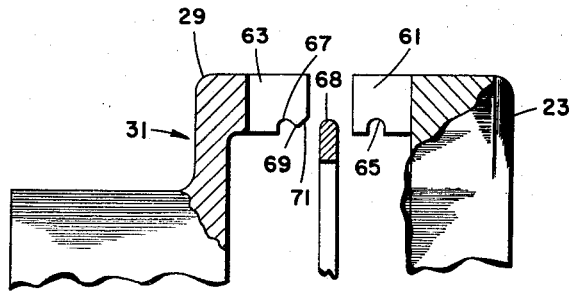
FIG. III
INVENTOR.
SAMUEL GILBERT
BY
Robert W. Ely
ATTORNEY United States Patent Office 2,942,481
Patented June 28, 1960

2,942,481

STARTER HAVING REVERSE TORQUE RELEASE

Samuel Gilbert, Cedar Grove, N.J., assignor to Bendix Aviation Corporation, Teterboro, N.J., a corporation of Delaware Filed Jan. 8, 1959, Ser. No. 785,613

2 Claims. (Cl. 74—7)

This invention relates to aircraft turbine starters and more particularly concerns such starters having a coupling such as a sprag type clutch which permits torque to be transmitted from the starter to the associated engine for starting but prevents the engine from driving the starter after it is started.

In aircraft engine starters using sprag-type clutches, it is necessary to prevent, in case of sprag clutch failure, the aircraft engine from accelerating the starter to destruction. If the sprag clutch fails, the engine can drive the starter gearing and turbine at speeds which cause destruction since such speeds are far in excess of the starter design speed. Prior proposals and designs for preventing such damage involved constructions which were expensive and difficult to assemble.

An object of the present invention is to provide an improved reverse torque release means for starters having overrunning arrangements.

A further object is to provide such a release which is more reliable and more economically manufactured than prior devices.

Another object is the provision of an improved aircraft starter having a sprag clutch and a reverse overload release which has starter-type jaws held by a lock ring at the inner surfaces of the jaws until a predetermined reverse torque is generated.

The realization of the above object along with the features and advantages of the present invention will be apparent from the following description and the accompanying drawing in which:

Fig. 1 is a side cross-sectional view of a starter having sprag clutch, starter-type jaws and a lock ring which is held in circumferential grooves.

Fig. 2 is an enlarged side view of the jaws of Fig. 1 and

Fig. 3 is a disassembled cross-sectional showing of the jaws and ring of Fig. 1.

Referring to Fig. 1, the gear member 11 of a turbine starter gear train is rotatably mounted by spaced roller bearings 13 and 14 on the axially-extending stationary support member 15. Tubular gear member 11 has small-diameter engine section 17 and a large-diameter inner section 18. Section 17 closely surrounds the engine end of support member 15 and supports ball bearings 21 and 22 on which output barrel member 23 is rotatably mounted.

A conventional overrunning sprag-type clutch 25 connects the inner section 18 of the gear member to the inner end of the surrounding output member 23 so that the starter can drive the engine, but the engine cannot drive the starter. The output member 23 has reverse torque release means 27 (to be described) at its engine end separably connecting it to a facing flange 29 of an engine coupling member 31. The engine coupling member 31 has a reduced-diameter tubular section 33 which has internal axially-extending spline 35. Spline 35 mates with spline 37 of engine member 39 so that coupling member 31 can move axially to the left or toward the engine end of the engine member 39 which connects to the jet engine of an aircraft. Starter housing 41 (shown in part) which connects to the engine housing and supports the axial stationary member 15 confines a conventional annular seal device 43 which contacts engine coupling member 31.

A spring-biased means 51 which is comprised of a spring 53 and carbon rod 55 is mounted in an axial hole 57 in the engine end of the support member 15. The rod 55 abuts plate 57 of engine coupling member 31. Means 51 is arranged to lightly urge the engine coupling member 31 to the left so that, when member 31 is disconnected from the output member 23 it will not contact the output member.

With reference to Figs. 2 and 3, the reverse torque release means 27 is provided by axial-extending teeth 61 of the starter jaw type in the engine end of the output member 23, similar teeth 63 in the facing part of flange 29 of the engine-coupling member 31, circumferential grooves 65 and 67 in the inside diameters of the teeth 61 and 63, a split, resilient lock ring 68 in the grooves and radii or chamfers 69 at grooves 67. Chamfers 71 are also provided in the engine-coupling teeth 63 outwardly of radii or chamfers 69. The tops of the radii have a diameter intermediate in diameters of the bottom of the grooves and the inner diameter of the teeth. The ring 68 has a rounded outer surface which fits on the rounded bottoms of the grooves 65 and 67. The free diameter of the ring is slightly greater than the diameter of the grooves and the ring is compressible into the grooves. The teeth 61 and 63 which have axially-extending and inclined faces as shown in Fig. 2 separate axially as is well known when axial-separating forces are generated at the inclined faces. Ring 68 will restrain separation until a reverse torque of a predetermined value is exerted. With such action upon reversal of torque, the radii 69 and chamfers 71 facilitate the forcing of the washer 68 out of grooves 67 and the teeth will fully separate with the washer being retained in groove 65 which is essentially semi-circular. Chamfers 71 and radii 69 in the engine teeth 63 also provide easy assembly as will be apparent from Fig. 3. It is to be noted with reference to Fig. 1 that an annular bearing retaining ring 73 is threaded in the interior of output member 23 and serves to confine the outer race of bearing 21. It is also noteworthy that the ring 68 of the release 27 is unaccessible so that the protective function cannot be easily eliminated.

In operation, it is apparent that the gear member 11 drives the output member 23 through one-way clutch 25 and that output member 23 drives the engine coupling member 31 through the reverse torque release means 27 so that a jet engine connected to engine member 39 is started. At that time, the gear member 11 will be de-energized and the engine normally overruns the starter due to clutch 25 as is conventional. However, if there is sprag failure or a similar malfunction, the reverse torque release 27 is actuated so that the engine does not accelerate the starter to destruction. With a reverse torque of a predetermined value, the resilient ring or washer 68 is forced out of grooves 67 due to the axial separation forces at jaw teeth 61 and 63. The removal of washer 68 is faciliated by radii 69 and chamfers 71. The jaws will completely separate due to axial separation forces and member 31 slides to the left over spline 37 of the engine member 39. The washer 67 is retained in grooves 65 after the jaw teeth are completely separated. The spring-loaded carbon rod 55 remains in contact with plate 57 of the engine coupling member 31 and exerts sufficient force to space the jaws so that clashing is prevented.

It is to be understood that persons skilled in the art

What is claimed is:

1. In a high speed starter for aircraft jet engines, a stationary axial-extending support member, a tubular gear member rotatably supported on said stationary member, a barrel output member rotatably supported on said gear member, a sprag clutch connecting said barrel output member to said tubular gear member, the engine end of said output member having axially-extending jaw teeth, an engine coupling member having axially-extending jaw teeth mated with the jaw teeth of said output member, the engine end of said coupling member having an axial spline for connection to an engine member, said jaw teeth having aligned inwardly facing grooves, spring-biased means carried by said stationary member contacting said coupling member, a resilient split lock ring fitted in said grooves, said lock ring being constructed so that it is urged out of said grooves when a predetermined reverse torque is exerted on said jaw teeth, said spring-biased means being arranged to hold said jaw teeth in spaced relation when separated.

2. In a high speed starter for aircraft jet engines, a stationary axial-extending support member, a tubular gear member rotatably supported on said stationary member, a barrel output member rotatably supported on said gear member, a sprag clutch connecting said barrel output member to said tubular gear member, the engine end of said output member having axially-extending jaw teeth, an engine coupling member having axially-extending jaw teeth mated with the jaw teeth of said output member, the engine end of said coupling member having an axial spline for connection to an engine member, said jaw teeth having aligned inwardly facing grooves, the groove in said output member being essentially semicircular, the edge of the groove in said coupling member adjacent the jaw teeth of said output member being rounded to a reduced diameter, spring-biased means carried by said stationary member contacting said coupling member, a resilient split lock ring fitted in said grooves, said lock ring being arranged so that it is urged out of said groove in said output member when a predetermined reverse torque is exerted on said jaw teeth, said spring-biased means being arranged to hold said jaw teeth in spaced relation when separated.

References Cited in the file of this patent

UNITED STATES PATENTS 2,710,763   Gilbert _____ June 14, 1955

FOREIGN PATENTS 762,644   Germany _____ Oct. 20, 1952